(12) United States Patent
Oljaca et al.

(10) Patent No.: US 8,507,403 B2
(45) Date of Patent: Aug. 13, 2013

(54) PROCESS FOR PRODUCING EXHAUST TREATMENT CATALYST POWDERS, AND THEIR USE

(75) Inventors: Miodrag Oljaca, Albuquerque, NM (US); Toivo T. Kodas, Albuquerque, NM (US); Ranko P. Bontchev, Albuquerque, NM (US); Klaus Kunze, Albuquerque, NM (US); Kenneth C. Koehlert, Albuquerque, NM (US)

(73) Assignee: Cabot Corporation, Boston, MA (US)

( * ) Notice: Subject to any disclaimer, the term of this patent is extended or adjusted under 35 U.S.C. 154(b) by 299 days.

(21) Appl. No.: 12/163,235

(22) Filed: Jun. 27, 2008

(65) Prior Publication Data
US 2009/0325792 A1  Dec. 31, 2009

(51) Int. Cl.
*B01J 23/00* (2006.01)
*B01J 21/00* (2006.01)
*B01J 20/00* (2006.01)
*B01J 29/00* (2006.01)
*B01J 37/00* (2006.01)

(52) U.S. Cl.
USPC ............... 502/300; 502/63; 502/64; 502/73; 502/74; 502/104; 502/107; 502/110; 502/111; 502/113; 502/117; 502/302; 502/303; 502/304; 502/305; 502/306; 502/307; 502/308; 502/309; 502/310; 502/311; 502/312; 502/313; 502/314; 502/315; 502/316; 502/317; 502/318; 502/319; 502/320; 502/321; 502/322; 502/323; 502/324; 502/325; 502/326; 502/327; 502/328; 502/329; 502/330; 502/331; 502/332; 502/333; 502/334; 502/335; 502/336; 502/337; 502/338; 502/339; 502/340; 502/341; 502/342; 502/343; 502/344; 502/345; 502/346; 502/347; 502/348; 502/349; 502/350; 502/351; 502/352; 502/353; 502/354; 502/355; 502/415; 502/439

(58) Field of Classification Search
USPC ............ 502/60–85, 104, 107, 110, 111, 113, 502/117, 300–439
See application file for complete search history.

(56) References Cited

U.S. PATENT DOCUMENTS

| 5,883,037 A | * | 3/1999 | Chopin et al. | ............... 502/308 |
| 5,965,481 A | | 10/1999 | Durand et al. | |
| 6,165,247 A | * | 12/2000 | Kodas et al. | .................. 75/331 |

(Continued)

FOREIGN PATENT DOCUMENTS

| EP | 0940176 A2 | 9/1999 |
| WO | 2008067375 A1 | 6/2008 |

OTHER PUBLICATIONS

International Search Report of related PCT/US2009/047770 (WO2009158286) mailed Feb. 10, 2010.

*Primary Examiner* — Cam N. Nguyen

(57) ABSTRACT

A process is described for producing a powder batch comprises a plurality of particles, wherein the particles include (a) a first catalytically active component comprising at least one transition metal or a compound thereof; (b) a second component different from said first component and capable of removing oxygen from, or releasing oxygen to, an exhaust gas stream; and (c) a third component different from said first and second components and comprising a refractory support. The process comprises providing a precursor medium comprising a liquid vehicle and a precursor to al least one of said components (a) to (c) and heating droplets of said precursor medium carried in a gas stream to remove at least part of the liquid vehicle and chemically convert said precursor to said at least one component.

32 Claims, 8 Drawing Sheets

(56) References Cited

U.S. PATENT DOCUMENTS

| | | |
|---|---|---|
| 6,338,809 B1 | 1/2002 | Hampden-Smith et al. |
| 6,555,022 B2 * | 4/2003 | Hampden-Smith et al. .......... 252/301.4 R |
| 6,660,680 B1 * | 12/2003 | Hampden-Smith et al. .. 502/180 |
| 6,679,937 B1 | 1/2004 | Kodas et al. |
| 6,730,245 B2 * | 5/2004 | Hampden-Smith et al. ...... 264/7 |
| 6,770,226 B2 * | 8/2004 | Hampden-Smith et al. .... 264/13 |
| 6,830,823 B1 * | 12/2004 | Kodas et al. .................. 428/570 |
| 6,967,183 B2 * | 11/2005 | Hampden-Smith et al. .. 502/101 |
| 6,991,754 B2 * | 1/2006 | Hampden-Smith et al. ...... 264/7 |
| 6,993,934 B2 * | 2/2006 | Kodas et al. ................... 65/17.4 |
| 7,066,976 B2 * | 6/2006 | Hampden-Smith et al. .... 75/332 |
| 7,083,747 B2 * | 8/2006 | Hampden-Smith et al. ...... 264/7 |
| 7,087,198 B2 * | 8/2006 | Hampden-Smith et al. .... 264/14 |
| 7,097,686 B2 * | 8/2006 | Chandler et al. ................ 75/331 |
| 7,128,852 B2 * | 10/2006 | Hampden-Smith et al. .... 264/14 |
| 7,507,687 B2 * | 3/2009 | Kodas et al. .................. 502/101 |
| 7,553,433 B2 * | 6/2009 | Hampden-Smith et al. .... 264/14 |
| 7,582,134 B2 * | 9/2009 | Hampden-Smith et al. .... 75/336 |
| 7,585,811 B2 * | 9/2009 | Nakamura et al. ............ 502/327 |
| 7,601,670 B2 * | 10/2009 | Yasuda et al. ................. 502/326 |
| 7,625,420 B1 * | 12/2009 | Kodas et al. .................... 75/252 |
| 7,632,331 B2 * | 12/2009 | Hampden-Smith et al. .... 75/332 |
| 7,674,744 B2 * | 3/2010 | Shiratori et al. .............. 502/327 |
| 7,713,908 B2 * | 5/2010 | Yamamoto et al. ........... 502/300 |
| 7,713,911 B2 * | 5/2010 | Wakamatsu et al. .......... 502/332 |
| 7,722,687 B2 * | 5/2010 | Hampden-Smith et al. . 29/623.5 |
| 2002/0160912 A1 | 10/2002 | Morikawa et al. |
| 2003/0064265 A1 * | 4/2003 | Hampden-Smith et al. .... 429/30 |
| 2003/0118884 A1 * | 6/2003 | Hampden-Smith et al. .... 429/30 |
| 2004/0072683 A1 * | 4/2004 | Kodas et al. ................... 502/224 |
| 2004/0080256 A1 * | 4/2004 | Hampden-Smith et al. .. 313/467 |
| 2004/0087439 A1 | 5/2004 | Hwang et al. |
| 2005/0100666 A1 * | 5/2005 | Hampden-Smith et al. .. 427/212 |
| 2005/0116369 A1 * | 6/2005 | Hampden-Smith et al. ...... 264/7 |
| 2006/0083694 A1 * | 4/2006 | Kodas et al. .................... 424/46 |
| 2006/0162497 A1 | 7/2006 | Kodas et al. |
| 2006/0165910 A1 | 7/2006 | Kodas et al. |
| 2006/0247122 A1 * | 11/2006 | Hampden-Smith et al. .. 502/101 |
| 2007/0096057 A1 * | 5/2007 | Hampden-Smith et al. ....... 252/301.16 |
| 2007/0160899 A1 | 7/2007 | Atanassova et al. ............ 429/44 |
| 2007/0204724 A1 * | 9/2007 | Hampden-Smith et al. .... 75/351 |
| 2007/0256517 A1 * | 11/2007 | Hampden-Smith et al. .... 75/332 |
| 2007/0257388 A1 * | 11/2007 | Hampden-Smith et al. .... 264/12 |
| 2007/0298961 A1 * | 12/2007 | Rice et al. ..................... 502/101 |
| 2008/0226958 A1 * | 9/2008 | Sun et al. ........................ 429/29 |
| 2008/0318757 A1 * | 12/2008 | Fotou et al. ..................... 501/29 |
| 2009/0131249 A1 * | 5/2009 | Takeshima et al. ........... 502/263 |
| 2010/0151267 A1 * | 6/2010 | Kodas et al. .................. 428/570 |
| 2010/0230841 A1 * | 9/2010 | Hampden-Smith et al. ...... 264/7 |

\* cited by examiner

PROCESS FOR PRODUCING EXHAUST TREATMENT CATALYST POWDERS, AND THEIR USE

FIELD

This invention relates to the process for producing exhaust gas treatment catalyst powders and to methods of their use.

BACKGROUND

Exhaust gas from internal combustion engines, power plants, industrial furnaces, heaters, diesel engines, and other devices contains nitrogen oxides, carbon monoxide, and unburned hydrocarbons. All of these emissions are hazardous to the environment and are subject to increasingly strict governmental regulation. Hence there is a significant interest in developing improved catalysts and processes and devices for treating exhaust gases to reduce or eliminate these compounds.

One common route for reducing the level of nitrogen oxides, carbon monoxide, and unburned hydrocarbons in exhaust gas, especially the exhaust gas from internal combustion engines, involves the use of one or more catalysts. For example, it is well known that nitrogen oxides ($NO_2$ and $NO$, collectively referred to as $NO_x$) can be catalytically converted to nitrogen in the presence of a reducing agent, such as ammonia or hydrocarbons, whereas carbon monoxide and unburned hydrocarbons can be catalytically oxidized to carbon dioxide and a mixture of carbon dioxide and water, respectively. In some cases, a single catalyst system, generally known as a three-way catalyst, can be used to simultaneously reduce $NO_x$, oxidize carbon monoxide, and oxidize unburned hydrocarbons in an exhaust stream, whereas in other cases different catalysts can be used to treat different toxic components of the exhaust.

Known exhaust gas treatment catalysts include nano-clusters of a precious metal, for example, platinum, dispersed on a high surface area support material, such as a metal oxide. More recently, focus has been directed towards catalyst systems in which the level of precious metal is reduced or eliminated, often by the use of supported multi-component metal alloy or oxide compositions, such as mixed oxides of, for example, copper, iron, nickel, cobalt, cerium, and/or zirconium combined with an alumina-based support material. In general, however, these catalyst systems are produced by conventional wet chemistry techniques (impregnation, precipitation, etc), which are typically time-consuming multi-step processes and which are not highly engineered with regard to homogeneity, material interface, structural stability, composition, porosity and other properties. For example, using traditional wet chemistry, it is often difficult to produce finely and homogeneously distributed complex multi-component materials attached to a high surface area support. This is even more difficult with complex metal oxide supports. Moreover, wet chemistry processes are typically low temperature processes requiring additional heat treatment of the structured particulate product. In addition, the temperature stability of the resultant heat treated catalysts is frequently not acceptable for demanding high temperature applications, such as treatment of exhaust gas emissions.

According to the present invention, a facile and flexible route to the production of the high surface area supports and catalytically active phases required for exhaust gas emission catalysts has now been developed, in which one or more catalyst precursors dispersed in a liquid are introduced into a heated reactor and are chemically converted to particulate catalyst component(s) in a flowing gas stream within the reactor. The process is particularly well adapted to the production of hierarchically structured particles in a single step or a small number of steps. Moreover, the resultant structured particles have improved properties as compared with structured particles produced by conventional wet chemistry techniques. For example, particles produced by these vapor phase conversion processes typically exhibit significantly increased homogeneity, dispersion and surface area for the active phase dispersed on the support. Moreover, this high surface area is generally preserved after exposure to high temperatures, primarily because the particles are exposed to a high temperature environment during their production.

SUMMARY

In one aspect, the invention resides in a process for producing a powder batch comprising a plurality of particles, wherein the particles include (a) a first catalytically active component comprising at least one transition metal or a compound thereof; (b) a second component different from said first component and capable of removing oxygen from, or releasing oxygen to, an exhaust gas stream; and (c) a third component different from said first and second components and comprising a refractory support, the process comprising:
(a) providing a precursor medium comprising a liquid vehicle and a precursor to at least one of said components (a) to (c); and
(b) heating droplets of said precursor medium carried in a gas stream to remove at least part of the liquid vehicle and chemically convert said precursor to said at least one component.

Conveniently, said heating is conducted at a temperature of at least 200° C., such as from about 300° C. to about 3000° C., typically for a time less than 30 seconds. Conveniently, said heating is conducted by spray conversion, spray pyrolysis or flame spraying.

Conveniently, said heating is conducted at temperature that is higher than the temperature at which precursors to at least one of the components (a) to (c) thermally decompose.

Conveniently, said droplets have an average size between about 10 and about 100 microns, such as between about 10 and about 50 microns, for example between about 10 and about 30 micron.

Conveniently, said precursor comprises at least one of said components dissolved or suspended in a liquid vehicle. Conveniently, said precursor comprises suspended particles comprising at least one of said components. Conveniently, said particles have an average size between about 1 and 100 microns, such as between about 2 and 50 microns, for example between about 2-10 microns. Conveniently, said particles comprising one of the components (a) to (c) have surface area above about 50 $m^2/g$.

In still yet further aspect, the invention resides in a process for removing one or more contaminants (including $NO_x$, carbon monoxide, sulfur and/or hydrocarbons) from an exhaust stream, said process comprising contacting said exhaust stream with a particulate catalyst formulated from the powder batch as described herein.

In one embodiment, said at least one transition metal comprises an element selected from the fourth Period of Groups 3 to 12 of the Periodic Table of Elements, such as copper, iron, manganese, cobalt, vanadium, chromium, and/or nickel, especially copper. Conveniently, said at least one transition metal is present in the powder batch in at least two different oxidation states. Conveniently, said first catalytically active component comprises an alloy or mixed oxide of one or more transition metals selected from the fourth Period of Groups 3 to 12 of the Periodic Table of Elements.

In another embodiment, said at least one transition metal comprises an element selected from the fifth and sixth Periods of Groups 8 to 11 of the Periodic Table of Elements, such as rhodium, palladium, platinum, gold, ruthenium, silver and/or iridium. Conveniently, said first catalytically active component comprises an alloy of at least one transition metal selected from the fifth and sixth Periods of Groups 8 to 11 of the Periodic Table of Elements and at least one further metal selected from the fourth Period of Groups 3 to 12 of the Periodic Table and/or a further element from the fifth and sixth Periods of Groups 8 to 11 of the Periodic Table.

Conveniently, said second component comprises a cerium-containing oxide species, which typically has a fluorite structure and optionally contains one of more additional elements selected from zirconium, lanthanum, praseodymium, neodymium, yttrium, gadolinium and mixtures thereof.

Conveniently, said third component comprises an oxygen-containing compound of aluminum, such as alumina or a stabilized alumina, optionally in combination with one or more additional elements selected from lanthanum, magnesium, copper, iron, calcium, strontium, barium, phosphorus, silicon and mixtures thereof. Conveniently, said third component comprises a compound having the crystal structure of gamma alumina, transition phase alumina, a spinel, a perovskite, an ilmenite, a delafosite, a zeolite and/or an aluminophosphate. Conveniently, said third component comprises $MgAl_2O_4$.

In one embodiment, said first catalytically active component is physically and/or chemically separated from said refractory support.

Conveniently, one or both of said second and third components comprises particles having an internal porosity of at least 0.1 cc/g, such as at least 0.5 cc/g.

Conveniently, one or both of said second and third components comprises a collection of particles having an inter-particle porosity of at least 0.1 cc/g, such as at least 0.5 cc/g.

Conveniently, one or both of said second and third components comprises particles have pore size of at least 5 nm, such as from about 7 nm to about 50 nm.

Conveniently, one or both of said second and third components comprises a collection of cenospherical particles.

In one embodiment, the powder batch includes at least a fourth component different from said first, second and third components and effective to remove sulfur, nitrogen oxides and/or hydrocarbons from an exhaust gas stream.

Conveniently, said powder batch has a weight average particle size of from about 100 nanometers to about 100 microns, such as from about 1 micron to about 50 microns.

Conveniently, said powder batch comprises a plurality of composite particles wherein each composite particle comprises at least two of said components (a) to (c). In one embodiment, each composite particle comprises at least said first component (a). In another embodiment, each composite particle comprises each of said components (a) to (c).

In a further aspect, the invention resides in a process for producing a powder batch comprising a plurality of particles, wherein the particles include (a) a first catalytically active component comprising at least one transition metal, particularly copper or palladium, or a compound thereof; and (b) a second component different from said first component and capable of removing oxygen from, or releasing oxygen to, an exhaust gas stream, the second component comprising a mixed oxide of at least cerium and zirconium; the process comprising:

(a) providing a precursor medium comprising a liquid vehicle and a precursor to at least one of said components (a) and (b); and (b) heating droplets of said precursor medium carried in a gas stream to remove at least part of the liquid vehicle and chemically convert said precursor to said at least one component.

Conveniently, said mixed oxide further comprises at least one of lanthanum, aluminum, neodymium, yttrium and praseodymium.

In yet a further aspect, the invention resides in a catalyst powder comprising particles of at least one of a refractory component and an oxygen storage component and a copper oxide species dispersed on at least some of said particles, wherein the catalyst powder, when subjected to Temperature Programmed Reduction, exhibits at least one hydrogen adsorption peak at a temperature of less than 160° C.

Conveniently, the catalyst powder comprises particles of a cerium-containing oxide species as an oxygen storage component.

Conveniently, the catalyst powder comprises particles of a oxygen-containing aluminum compound as a refractory support.

In still yet a further aspect, the invention resides in a catalyst powder comprising particles of at least one of a refractory component and an oxygen storage component and a copper oxide species dispersed on at least some of said particles, wherein the catalyst powder, when subjected to X-ray analysis, exhibits no peaks characteristic of CuO for copper loading up to 8 wt % Cu per 100 $m^2$ of the surface of said particles.

Conveniently, the catalyst powder comprises particles of a cerium-containing oxide species as an oxygen storage component.

Conveniently, the catalyst powder comprises particles of a oxygen-containing aluminum compound as a refractory support.

DETAILED DESCRIPTION

Figure 1:
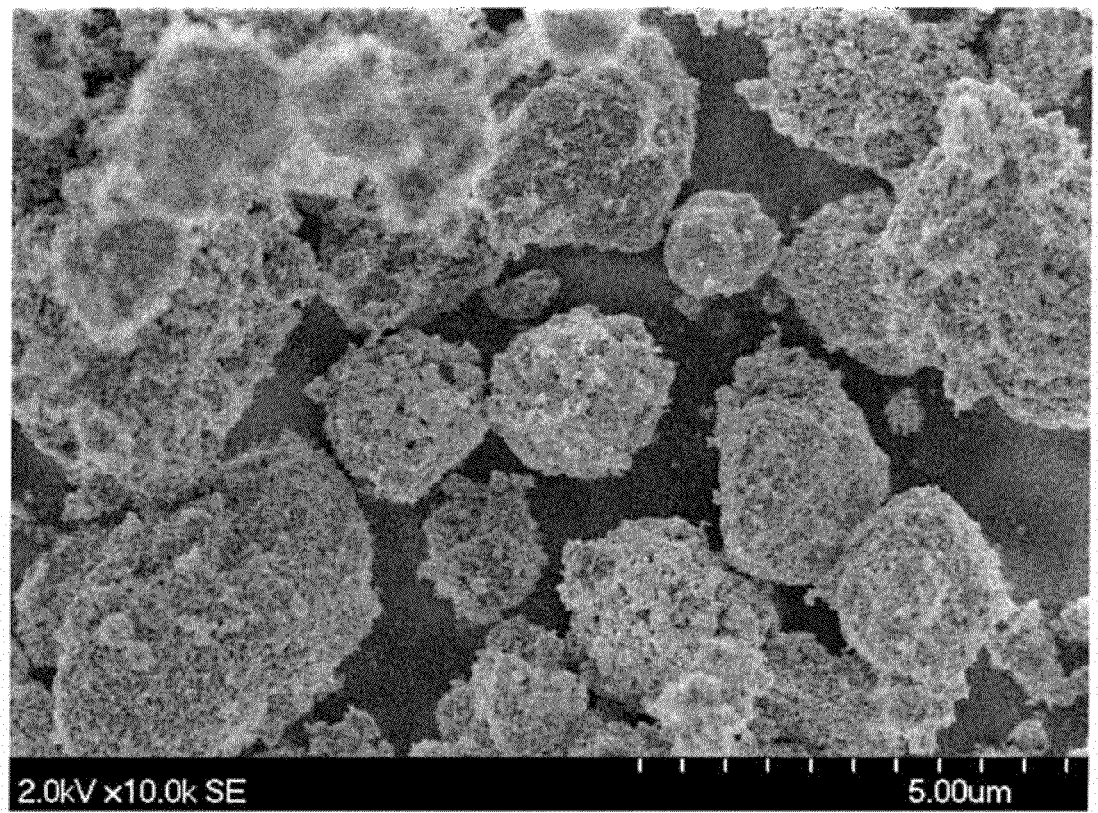
FIG. 1 is a Scanning Electron Micrograph (SEM) of the powder product of Example 1.

The present invention relates to the production, composition and use of a powder batch useful as a catalyst for removing pollutants from exhaust gas emissions, especially the exhaust gas emissions from internal combustion engines. In particular, the process for producing a powder batch comprising a plurality of particles, wherein the particles include (a) a first catalytically active component comprising at least one transition metal or a compound thereof; (b) a second component different from said first component and capable of removing oxygen from, or releasing oxygen to, an exhaust gas stream; and (c) a third component different from said first and second components and comprising a refractory support, the process comprising at least one step of heating a precursor to said at least one component, wherein said precursor is dispersed in a liquid and carried in a gas stream in a reactor, and wherein the heating chemically converts said precursor to particles of the respective component.

Production of the Powder Batch

The powder batch described herein is produced by a high temperature spray conversion process. In this approach, a precursor medium is produced which comprises a precursor to at least one the components of the powder batch dissolved or suspended in a liquid carrier, while the remaining components, if any, of the powder batch are dispersed as particles in the liquid carrier. The liquid carrier is then atomized to produce an aerosol comprising droplets dispersed and suspended in a carrier gas. The aerosol is then heated at a temperature of at least 200° C., generally from about 300° C. to about 3000° C., in order to: (1) remove at least a portion of the liquid carrier in the droplets; and (2) convert the or each precursor to the corresponding component of the powder batch. Depending on the temperature required to convert each precursor, the conversion may take place in a spray conversion reactor (which is generally operable at conversion temperatures between about 200° C. and about 600° C.), a spray pyrolysis reactor (which is generally operable at conversion temperatures between about 500° C. and about 1500° C.) or a flame spray reactor (operable at conversion temperatures between about 1200° C. and about 3000° C.).

Conveniently, the precursor medium is produced by dissolving a soluble precursor to the catalytically active material, for example copper nitrate, in a liquid carrier, such as water, while pre-made particles of the oxygen storage material, for example a ceria-based material, and the refractory material, for example, stabilized alumina, are dispersed in the liquid carrier. Alternatively, soluble precursor(s) to the oxygen storage material and/or the refractory material can be dissolved in the liquid carrier in addition to the precursor to the catalytically active material. In addition, it is possible to produce a precursor medium in which solid particles of catalytically active material, for example copper oxide, are dispersed in the liquid carrier, whereas soluble precursor(s) to the oxygen storage material and/or the refractory material are dissolved in the liquid carrier. Alternatively, the or each precursor to a component of the powder batch could be present in the carrier liquid as sub-micron or micronized particles suspended in the liquid. Also, where the precursor medium comprises solid particles of at least one component of the final powder batch, it is possible to produce said solid particles by an initial vapor phase, spray conversion process, such as flame spraying, in which a precursor to said at least one component is chemically converted in the vapor phase to produce said solid particles.

Thus, in a first embodiment, a soluble precursor to at least one catalytically active phase (AP) is dissolved in a carrier liquid and solid refractory material(s) (RM) and/or solid oxygen storage material(s) (OSM) are mixed with the solution to produce a slurry. The refractory material used may be in the form of a fumed powder with high outer porosity or in the form of a precipitated powder formed by liquid methods with preferentially high internal surface area. Similarly, the oxygen storage material may be in the form of a fumed powder with high outer porosity or in the form of a precipitated powder formed by liquid methods with preferentially high internal surface area. The final slurry is fed to a spray conversion reactor (SCR) or a spray pyrolysis reactor and reacted to form catalytic powders of the form AP/OSM/RM, AP/OSM or AP/RM.

In a second embodiment, the process of the first embodiment is followed, except a soluble precursor to at least one refractory material is dissolved in the carrier liquid to produce the refractory material(s) in situ.

In a third embodiment, the process of the first embodiment is followed, except a soluble precursor to at least one oxygen storage material is dissolved in the carrier liquid to produce the OSM in situ.

In a fourth embodiment, the process of the first embodiment is again followed, except the solid particles of the oxygen storage material or the refractory material or both are pre-prepared by flame spray pyrolysis using soluble precursors in a liquid fuel.

In a fifth embodiment, the process of the first embodiment is again followed, except at least some of the catalytically active phase (AP) has been placed on the oxygen storage material by flame spray pyrolysis using a combination of soluble precursors to the OSM and soluble precursors to the AP. In the subsequent spray conversion process to produce the final catalyst powder, additional soluble precursor to the same or different AP may optionally be added.

In a sixth embodiment, the process of the first embodiment is again followed, except the oxygen storage material and the refractory material are combined in one powder batch and used as such in the precursor slurry.

In a seventh embodiment, soluble precursors to solid oxygen storage materials (OSM), soluble precursors to stabilized refractory materials (RM), or a combination of soluble precursor(s) to active phase (AP) and soluble precursors to solid oxygen storage materials (OSM) are dissolved in a solvent. The final solution is fed to a flame spray pyrolysis reactor and reacted to form inorganic mixed metal oxide powders usable as OSM or RM or catalytic powders of the form AP/OSM or OSM/RM.

Generally, where the precursor medium contains solid particles of at least one component of the final powder batch, the solid particles are arranged to have a particle size of between about 0.1 micron and about 100 micron, such as between about 1 micron and about 10 micron.

By the term "precursor" is meant any compound capable of being chemically converted under the conditions employed in the spray conversion process to at least one component of the final powder batch. Suitable precursors therefore include inorganic salts of the elements contained in the powder batch, such as nitrates, sulfates and chlorides. Moreover, where the spray conversion is effected by a flame reactor or other high energy process, it may be desirable to employ one or more precursors in the form of salts of organic acids, such as hexanoates and neodecanoates, or other organic derivatives so that the precursor provides at least part of the fuel for the flame reactor.

The liquid carrier can be inorganic, organic, or an inorganic/organic mixture. Some non-limiting examples of suitable inorganic liquids include water and aqueous solutions, which may be pH neutral, acidic or basic. Some non-limiting examples of organic liquid vehicles include alcohols (e.g., methanol, ethanol, isopropanol, butanol), organic acids, glycols, aldehydes, ketones, ethers, waxes, or fuel oils (e.g., kerosene or diesel oil). The liquid carrier may include a mixture of mutually soluble liquid components, such as a mixture of mutually soluble organic liquids or a mixture of water with one or more organic liquids that are mutually soluble with water (e.g., some alcohols, ethers, ketones, aldehydes, etc.). Alternatively, liquid vehicle may contain multiple distinct liquid phases, for example, an emulsion, such as an oil-in-water or a water-in-oil emulsion.

In addition to acting as a carrier for the precursor(s) and, if present, the solid components of the powder batch, the liquid carrier may have a variety of other functions. For example, when the spray conversion is effected by a flame reactor, the liquid vehicle may be or include a component that is a fuel or an oxidant for combustion in a flame of the flame reactor. Such fuel or oxidant in the liquid may be the primary or a supplemental fuel or oxidant for driving the combustion in a flame.

Where the precursor medium is introduced into the spray conversion reactor as an aerosol, the aerosol can be produced using any suitable device that disperses liquid into droplets, such as for example, a spray nozzle. Examples of suitable spray nozzles include ultrasonic spray nozzles, multi-fluid spray nozzles and pressurized spray nozzles. Ultrasonic spray nozzles generate droplets of liquid by using piezoelectric materials that vibrate at ultrasonic frequencies to break up a liquid into small droplets. Pressurized nozzles use pressure and a separator or screen in order to break up the liquid into droplets. In some cases, pressurized nozzles may involve use of some vapor that is generated from the liquid itself in order to pressurize and break up the liquid into droplets. One advantage of using ultrasonic and pressurized nozzles is that an additional fluid is not required to generate liquid droplets. This may be useful in situations where the precursor dissolved in the liquid vehicle is sensitive and/or incompatible with other common fluids used in multi-fluid spray nozzles.

In addition to the use of a spray nozzle for dispersing the liquid medium, any other suitable device or apparatus for generating disperse droplets of liquid may be used. One example of a device that is useful in generating droplets of liquid is an ultrasonic generator. An ultrasonic generator uses transducers to vibrate liquids at very high frequencies which break up the liquid into droplets. One example of an ultrasonic generator that is useful in the present process is disclosed in U.S. Pat. No. 6,338,809, incorporated herein by reference in its entirety. Another example of a device that is useful in generating droplets of liquid is a high energy atomizer such as those used in carbon black production.

Generally, whatever method is employed to atomize the precursor medium, the aerosol produced is arranged to have an average droplet size between about 1 and about 100 microns, such as between about 3 and about 50 microns, for example between about 5 and about 30 micron. In certain cases, it may be desirable to introduce one or more precursors and/or components of the final powder batch to the spray conversion reactor as dry powders.

When the precursor medium is introduced into the spray conversion reactor as an aerosol in a liquid vehicle, the aerosol droplets are conveniently dispersed in a carrier gas. The carrier gas may include any combination of gas components in any concentrations. For example, the gas phase may include only components that are inert (i.e. nonreactive) in the reactor or the gas phase may comprise one or more reactive components (i.e., which decompose or otherwise react in the reactor). In addition, when the spray conversion is conducted in a flame reactor, the carrier gas may comprise a gaseous fuel and/or oxidant for combustion in the flame. Non-limiting examples of suitable gaseous oxidants are gaseous oxygen (which could be provided by making the gas phase from or including air) and carbon monoxide. Non-limiting examples of gaseous fuels that could be included in the carrier gas include hydrogen gas and gaseous organics, such as hydrocarbons (e.g., methane, ethane, propane, butane).

In one embodiment, the spray conversion step is conducted in a high temperature spray drier, in which the atomized precursor medium is contacted with a stream of a heated drying gas, generally air. High temperature spray driers typically operate at temperatures between about 300° C. and about 600° C. One suitable spray drier reactor is disclosed in U.S. Pat. No. 6,991,754, the entire contents of which are incorporated herein by reference.

In another embodiment, the spray conversion step is conducted in a spray pyrolysis reactor in which the droplets of the precursor medium are transported by the carrier gas through a furnace, typically a tubular furnace, maintained at a temperature of from about 500° C. to about 1500° C., such as in the range of from about 900° C. to about 1300° C. One suitable spray pyrolysis reactor is disclosed in U.S. Pat. No. 6,338,809, the entire contents of which are incorporated herein by reference.

In a further embodiment, the spray conversion step is conducted in a flame reactor. By a "flame reactor" is meant a reactor having an internal reactor volume directly heated by one or more than one flame when the reactor is operated. By "directly heated" is meant that the hot discharge of a flame flows into the internal reactor volume. By the term "flame" is meant a luminous combustion zone. One suitable flame reactor is disclosed in U.S. Patent Application Publication No. 2006/0162497, published on Jul. 27, 2006, the entire contents of which are incorporated herein by reference. Using a flame reactor, conversion temperatures in excess of 1000° C., such as from about 1200° C. to about 3000° C. can be attained.

It will be appreciated that the type of spray conversion process used to produce any given powder batch will depend on a number of factors, including the temperature required to convert the precursor compound(s) in the precursor medium to the desired component or components of the final catalyst.

In the spray conversion process, at least part of the liquid carrier is removed from the droplets of the precursor medium and the precursor compound(s) present in the precursor medium are chemically converted to the corresponding component(s) of the powder batch. As a result, a composite powder condenses from the precursor medium and can be recovered from the carrier gas by any convenient particle collection apparatus, such as a filter. Depending on the temperature of the spray conversion process, a quenching medium may be used to assist in cooling and condensation of the powder product so as to restrict growth of the catalyst particles. Generally the residence time of the precursor medium in the spray conversion reactor, prior to any quenching, is less than 60 seconds, such as less than 30 seconds.

Powder Batch

As noted above, the powder batch produced by the process of this invention comprises a first catalytically active component comprising at least one transition metal or a compound thereof, particularly but not exclusively an oxide of the transition metal.

In one embodiment, the first catalytically active component comprises at least one transition metal selected from the fourth Period of Groups 3 to 12 of the Periodic Table of Elements, such as copper, iron, manganese, cobalt, vanadium, chromium, and/or nickel, and especially copper. Thus, for example, suitable catalytically active materials include Cu(I) and Cu(II) oxides. Conveniently, the at least one transition metal is present in the powder batch in at least two different oxidation states, for example as a mixture or compound of Cu(I) and Cu(II) oxides. In addition, the first catalytically active component may comprise an alloy or mixed oxide of two or more transition metals from the fourth Period of Groups 3 to 12 of the Periodic Table of Elements or an alloy or mixed oxide of at least one transition metal from the fourth Period of Groups 3 to 12 of the Periodic Table of Elements and at least one further element, such as silver. Examples of suitable alloys and mixed oxides include CuNi, CuMn, CuFe and CuCo alloys and mixed oxides of copper with at least one of iron, manganese, cobalt, chromium and nickel.

In another embodiment, the first catalytically active component comprises an element or compound thereof selected from the fifth and sixth Periods of Groups 8 to 11 of the Periodic Table of Elements, such as rhodium, palladium, platinum, gold, ruthenium, silver and/or iridium, namely a so-called "precious metal". Conveniently, the precious metal is present in elemental form but can also be present as an alloy or mixed oxide of the precious metal with at least one further element, such as at least one metal selected from the fourth Period of Groups 3 to 12 of the Periodic Table (such as, copper, chromium, and/or manganese and/or) and/or a further element from the fifth and sixth Periods of Groups 8 to 11 of the Periodic Table. Thus, for example, suitable catalytically active materials include PdCu, PdCr and PdMn alloys.

In addition to the catalytically active component, the powder batch produced by the process of present invention also typically includes an oxygen storage material (OSM), namely a material capable of removing oxygen from, or releasing oxygen to, an exhaust gas stream depending on the composition of the gas stream being treated. Suitable oxygen storage materials comprise cerium-containing oxide species, such as mixed oxides of cerium with one of more additional elements such as zirconium, lanthanum, praseodymium, neodymium, yttrium, gadolinium and mixtures thereof. Particularly, suitable oxygen storage materials comprise cerium-based mixed oxides having the fluorite structure and also containing one or more of zirconium, lanthanum, and yttrium.

A third component of the powder batch produced by the process of present invention functions as a refractory support and typically comprises an oxygen-containing compound of aluminum. Suitable oxygen-containing aluminum compounds include aluminas, stabilized aluminas, such as aluminas stabilized with magnesium oxide and/or barium oxide, doped aluminas, such as lanthanum-doped aluminas, and refractory aluminates, such as magnesium aluminate and copper aluminate. Other suitable refractory supports comprise oxygen-containing compounds of aluminum with one of more additional elements selected from lanthanum, magnesium, copper, iron, calcium, strontium, barium, phosphorus, silicon and mixtures thereof. Conveniently, the resultant compound has the crystal structure of gamma alumina, transition phase alumina, a spinel, a perovskite, an ilmenite, a delafosite, a zeolite and/or an aluminophosphate.

In some embodiments, it is desirable to ensure that one or both of the refractory support and the oxygen storage material has significant internal porosity which is typically achieved by arranging that the refractory support comprises particles having an internal porosity of at least 0.1 cc/g, such as at least 0.5 cc/g. In addition, it may be desirable to ensure that the refractory support and/or the oxygen storage material comprise a collection of particles having an inter-particle porosity of at least 0.1 cc/g, such as at least 0.5 cc/g. In any event, it is to be appreciated that the references herein to "refractory" are intended to mean that the support is capable of withstanding the temperatures normally encountered in an exhaust gas stream, typically from about 200° C. to about 1100° C., without significant chemical or physical change.

It is to be appreciated that the present powder batch collectively includes particles containing a catalytically active material, an oxygen storage material and a refractory support, by which is meant that the powder batch may be composed of single function particles, each of which provides just one of the components of the batch, or may be composed of composite particles, each of which contains two or more components of the batch. Thus, for example, the catalytically active species may be dispersed on particles of the oxygen storage material or on the refractory support particles or may be dispersed on both the oxygen storage material and the refractory support particles. In addition, a first catalytically active material may be dispersed on particles of the oxygen storage material, while a second catalytically active material is dispersed on the refractory support particles. Composite particles containing all three components (a) to (c) are also possible. It is, however, to be appreciated that for some applications it may be preferred to hinder interaction between the catalytically active material and the refractory support, either by physically separating the materials using another component of the powder batch, such as the oxygen storage material, or by chemical separation, such as by chemically modifying the surface of the refractory support.

In addition to the catalytically active material, oxygen storage material and refractory support, the powder batch may contain other components effective to enhance the properties of the composition when used as an exhaust gas treatment catalyst. For example, the powder batch may include one or more components effective to remove sulfur, nitrogen oxides and/or hydrocarbons from an exhaust gas stream. For example, the powder batch may include at least one of a hydrocarbon trap in the form of aluminum silicate or aluminum phosphate, a NOx trap in the form of barium oxide and a sulfur scavenger in the form of iron oxides or nickel oxides or other more complex oxides such as perovskites that comprise iron, nickel and/or lanthanum.

As will be discussed below, at least one, and generally each, component of the powder batch is produced by a process in which droplets of a precursor medium comprising a liquid carrier and a precursor to at least one of the components of the batch are heated to remove at least part of the liquid carrier and chemically convert the precursor to particles of the desired component. In this way, it is found that the dispersion and activity of the catalytically active material are improved as compared with conventional wet chemistry preparations. Moreover, the particles of the powder batch substantially retain their properties after exposure to the high temperatures generally encountered by exhaust gas treatment catalysts. Where the catalytically active material is a dispersed copper oxide species, it is found that the powder batch, when subjected to Temperature Programmed Reduction in the manner described in the Examples, exhibits at least one hydrogen adsorption peak at a temperature of less than 160° C.

Post Treatment of the Powder Batch

The powder batch produced by the spray conversion process described above may be used directly as an exhaust treatment catalyst or may initially be subjected to one or more post-treatments to improve its catalytic activity or otherwise change its composition. Suitable post-treatments include further heating in air or reducing environment at room temperature or elevated temperature, milling, size classification, surface modification and other treatments know to those skilled in art.

In one embodiment, where the powder batch produced by the spray conversion process described above includes an alumina support, the powder batch can be subjected to heating in air at a temperature above 600° C. to induce interaction between the active phase and alumina support resulting in modification of the support surface and formation of surface spinels and/or bulk spinels. For example, the spray process described here can be used to produce MgO supported on an alumina support. The resulting powder can be post-treated at a temperature above 600° C. to induce formation of $Mg_x$-

Al$_y$O$_4$ spinel on the surface or in bulk of the carrier. Similar procedures can be used to produce copper spinels and variety of other spinels.

In another embodiment, the powder batch produced by the spray conversion process described above can be subjected to heating in a reducing environment at elevated temperature to induce partial reduction of the active phase or alloying of various phases.

The present powder batch may be used as a catalyst without the provision of a support or may be supported on a substrate. In one embodiment, the substrate is in the form of beads or pellets, which may be formed from alumina, silica alumina, silica, titania, mixtures thereof, or any suitable material. In another embodiment, the substrate is a honeycomb support, which may be a ceramic honeycomb support or a metal honeycomb support. Suitable ceramic materials for the support include sillimanite, zirconia, petalite, spodumene, magnesium silicates, silicon carbide, mullite, alumina, mullite, cordierite, other alumino-silicate materials, or combinations thereof. Other ceramic and metallic supports such as reticulated foams are also suitable. Preferably, the substrate support, whether metallic or ceramic, offers a three-dimensional support structure.

In an embodiment, the powder batch may be applied on the substrate as a washcoat. A washcoat may be formed by suspending the components of the catalyst in water to form an aqueous slurry, and washcoating the aqueous slurry onto the substrate. The slurry may be deposited onto the substrate in any suitable manner. For example, the substrate may be dipped into the slurry, or the slurry may be sprayed onto the substrate. Other methods of depositing the slurry onto the substrate known to those skilled in the art may also be used in alternative embodiments. If the substrate is a monolithic carrier with parallel flow passages, the washcoat may be formed on the walls of the passages. Gas flowing through the flow passages contacts the washcoat on the walls of the passages as well as materials that are supported on the washcoat.

Catalysts produced from the powder batch described herein exhibit activity in reducing the level of nitrogen oxides, carbon monoxide, and unburned hydrocarbons in exhaust gas from internal combustion engines, power plants, industrial furnaces, heaters, diesel engines, and other devices.

The invention will now be more particularly described in the following non-limiting Examples.

In the Examples, Scanning electron microscopy (SEM) analyses are performed on a Hitachi S-3500 N Scanning Electron Microscope. Images are collected at magnifications from 500× to 45000×. EDX spectra are collected at 20 kV and an acquisition time of 20 to 30 minutes. The sample powder is dispersed on a carbon tape.

Powder X-ray diffraction (XRD) analyses are performed on a Bruker AXS D8 advanced X-Ray diffractometer instrument. Copper K-alpha radiation is used with a power setting of 60 kV and 30 mA. The typical operational parameters are: divergence slit of 1°, antiscattering slit 1°, and a scan rate of 8.6°/min with 0.0144° data interval.

Hydrogen temperature program reduction (H$_2$-TPR) is performed on a Micromeritics Autochem 2920 apparatus. TPR tests are performed by heating a 0.15 g sample in fine powder form at a rate of 10° C./min from room temperature to 800° C. in a 10% H$_2$/air gas mixture at the flow rate of 50 ml/min (NTP). A cold trap filled with a mixture of isopropanol and liquid nitrogen is placed in the gas line upstream of the thermal conductivity detector (TCD) to remove water vapor.

The BET (Brunauer Emmett Teller) surface area and porosity of each sample is measured by multi-point N$_2$ adsorption/desorption cycles in a Micromeritics Tristar 3000 apparatus. Each sample is first degassed in a vacuum at 200° C. for 2 hours. An ultra-high purity (>99.999% pre) N$_2$ gas is used in the measurements.

Particle size distribution (PSD) analyses are performed on a Honeywell X100 series Microtrac particle size analyzer. In performing the analyses, a 0.25 g sample is mixed with 50 ml D.I. water and 3 drops of Darvan C surfactant. The resulting solution is then sonified for 3 minutes with a Branson 450 sonifier before loading into the recirculator.

Example 1

In this Example, a spray conversion process is used to produce a powder batch from a solution of a precursor to a catalytically active material, with as-made particles of an oxygen storage material and a refractory material being dispersed in the solution.

573 g of Cu(NO$_3$)$_2$ xH$_2$O (x=2.5-3) is dissolved in a slurry comprising 503 g of cerium zirconium lanthanum oxide (CZL), 754 g of lanthanum stabilized alumina and 34.78 kg of water. All reagents are used as directly supplied from vendors. The combined mixture is sheared for about 1-2 hours until the components are intimately mixed. The slurry is then introduced into a spray nozzle to generate an aerosol that is heated in a spray conversion reactor using air as the carrier gas. The spray conversion reactor is operated with an inlet temperature of 575° C. and an outlet temperature of 340° C. to produce a powder batch.

Figure 2:
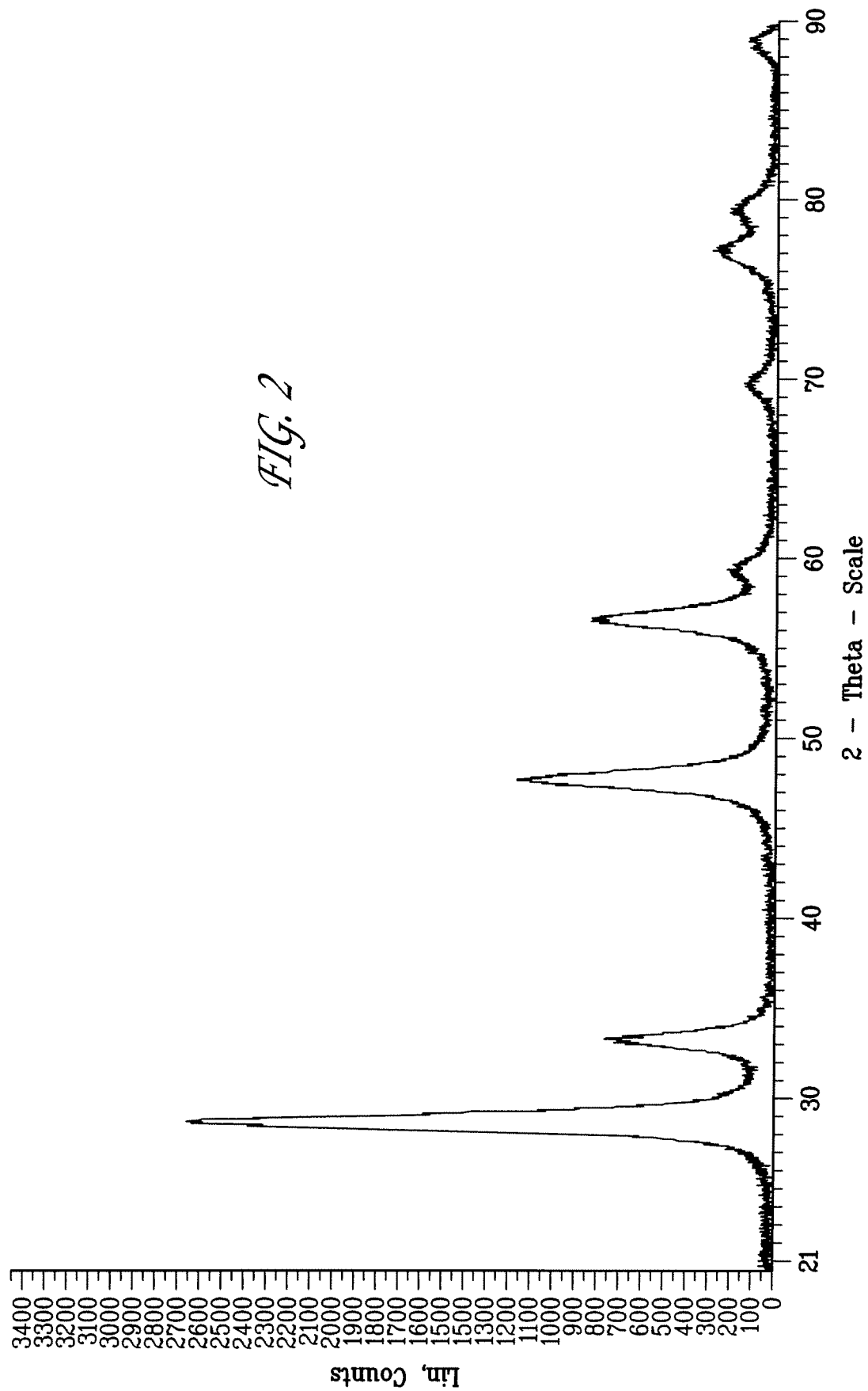
FIG. 2 is an X-ray diffraction pattern of the powder product of Example 1.

Scanning Electron Microscopy (FIG. 1) coupled with energy dispersive X-ray (EDS) of the powder after collection shows that the Cu species are dispersed on both the support material and the oxygen storage material. The X-ray diffraction (XRD) pattern of the powder (FIG. 2) shows only lines characteristic of the CZL support. The peaks characteristic of CuO are hard to distinguish indicating that the Cu species are uniformly distributed over the support and either amorphous-like or crystalline but smaller in size than resolution of XRD (<10 nm). The crystallite size of the CZL calculated from Scherrer equation is about 8 nm.

Elemental analysis of the resulting product as measured by inductive couple plasma (ICP) shows that the powder contains about 9.5 wt. % Cu. The surface area of the powder as measured by BET is 127 m$^2$/g, whereas the particle size distribution is mono-modal with d10 of 1.6 micron, d50 of 4.5 micron, and d95 of 13.8 micron. He-pycnometry shows an average particle density of 4.155 g/cm$^3$.

Figure 3:
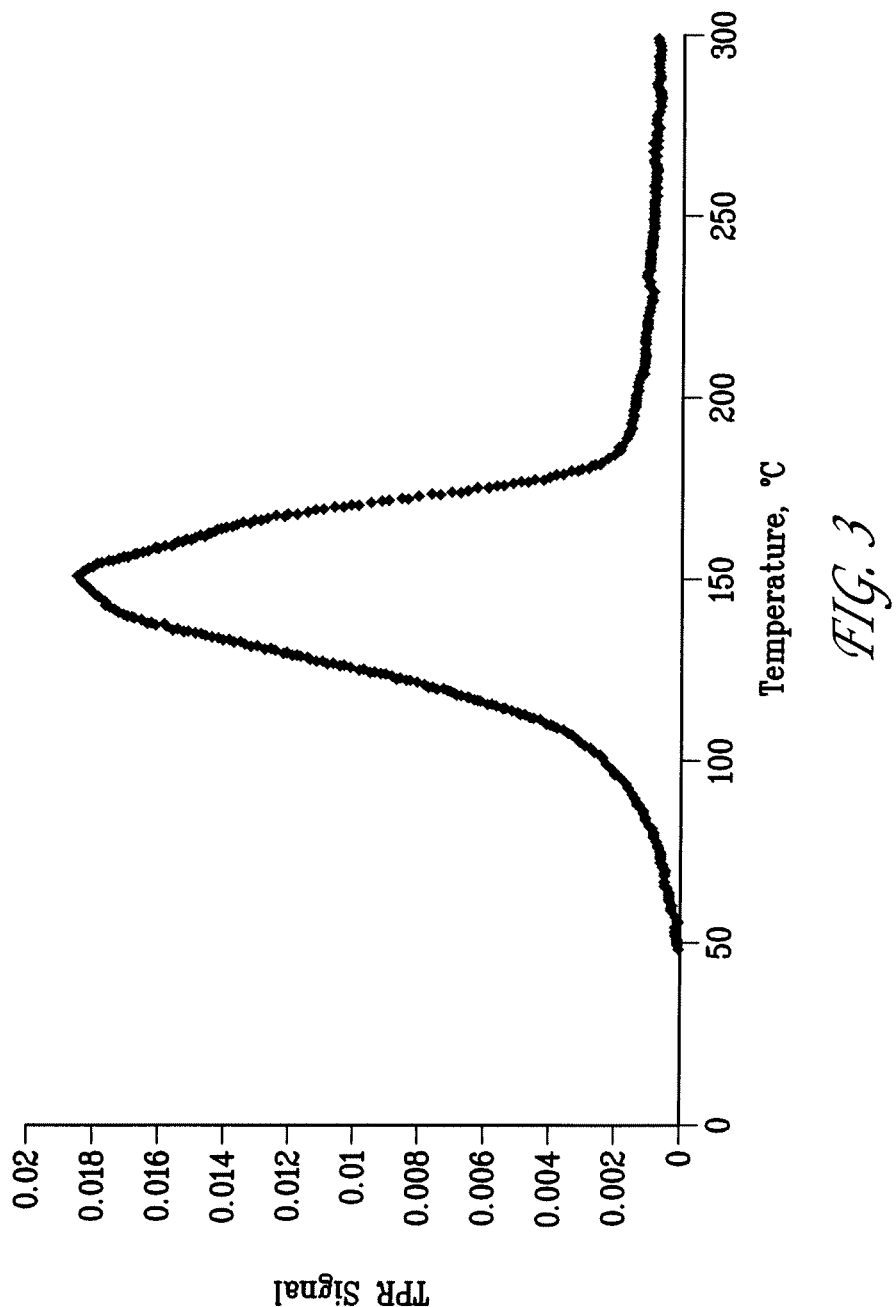
FIG. 3 is a hydrogen temperature program reduction ($H_2$-TPR) spectrum of the as-synthesized powder product of Example 1.

Hydrogen TPR experiments on the as-synthesized material show a strong reduction peak attributed to copper oxide species with maximum H$_2$ uptake at 150 C. [FIG. 3].

The catalyst powder is formed into slurry and coated onto a monolith to produce a catalyst. Catalytic testing is performed at 450° C. at varying air-fuel ratios. Using a feed stream composed of 250 ppm NO, 2000 ppm CO, 30 ppm C$_3$H$_8$, 20% CO$_2$, 10% H$_2$O, air for adjusting the air to fuel ratio to 1.0, and nitrogen as the balance, the catalyst in a fresh state is found to convert 97.2% NO$_x$ and 99.2% CO. After high temperature fuel cut aging at 800° C. for 16 hours, the catalyst is found to convert between 71.8% and 75.2% NO$_x$ and 97.2% CO.

Example 2

In this Example, the method described in Example 1 is used to produce catalyst powders with varying amounts of catalytically active material.

Varying amounts of $Cu(NO_3)_2 \cdot xH_2O$ (x=2.5-3) are dissolved in a slurry comprising cerium zirconium lanthanum oxide (CZL), lanthanum stabilized alumina (La—$Al_2O_3$) and water. Alternatively, varying amounts of $Cu(NO_3)_2 \cdot xH_2O$ (x=2.5-3) are dissolved in a slurry comprising only one of the support components. All reagents are used as directly supplied from vendors. The combined mixture is sheared for about 1-2 hours until the components are intimately mixed. The slurry is then introduced into a spray nozzle to generate an aerosol that is heated in a spray conversion reactor using air as the carrier gas. The spray conversion reactor is operated with an inlet temperature of 575° C. and an outlet temperature of 340° C. to produce powder batches.

Figure 4A:
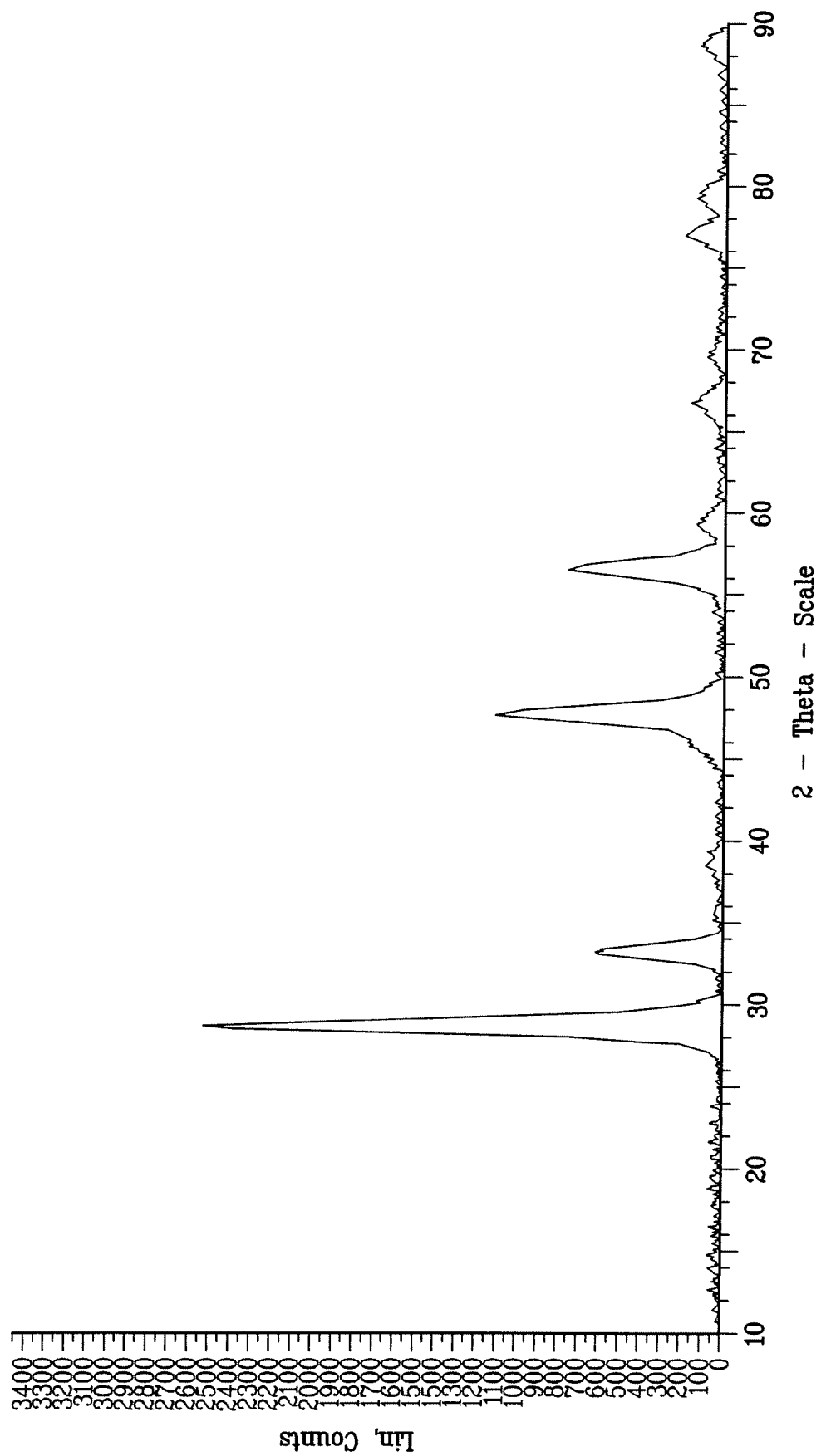
FIGS. 4 and 5 are X-ray diffraction patterns of the powder products of Example 2.
Figure 4B:
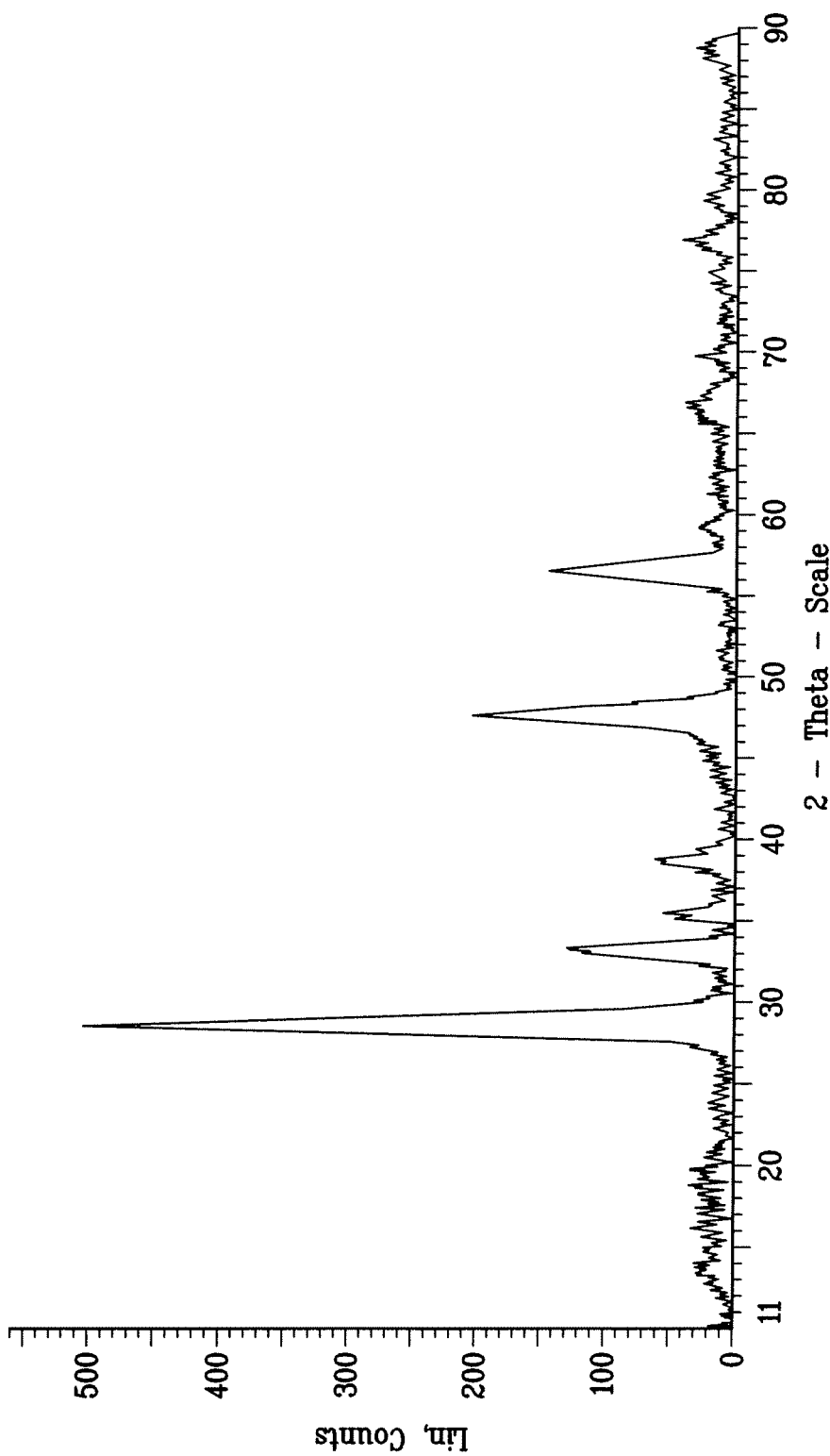

FIGS. 4a and 4b show XRD patterns for catalyst powders with 12% wt CuO and 20 wt % CuO supported on CZL/La—$Al_2O_3$ carriers. The XRD pattern for 12% CuO [FIG. 4a] showed only lines characteristic of CZL and $Al_2O_3$ carriers. For the catalyst powder with 20% CuO loading [FIG. 4b], very broad peaks characteristic of CuO become distinguishable in XRD pattern. The catalyst surface area decreased with increased loading of active phase from 130 m2/g (for pure carrier powder) to 109 m2/g for 20 wt % loading and then to 90 m2/g for catalysts powders with 40% CuO. The CuO crystal size for both 30 wt % and 40% catalyst was estimated at 12 nm, respectively, based on Scherrer equation. The CuO peaks are too broad to allow reliable use of the Scherrer formula for loadings below 30% CuO.

Figure 5:
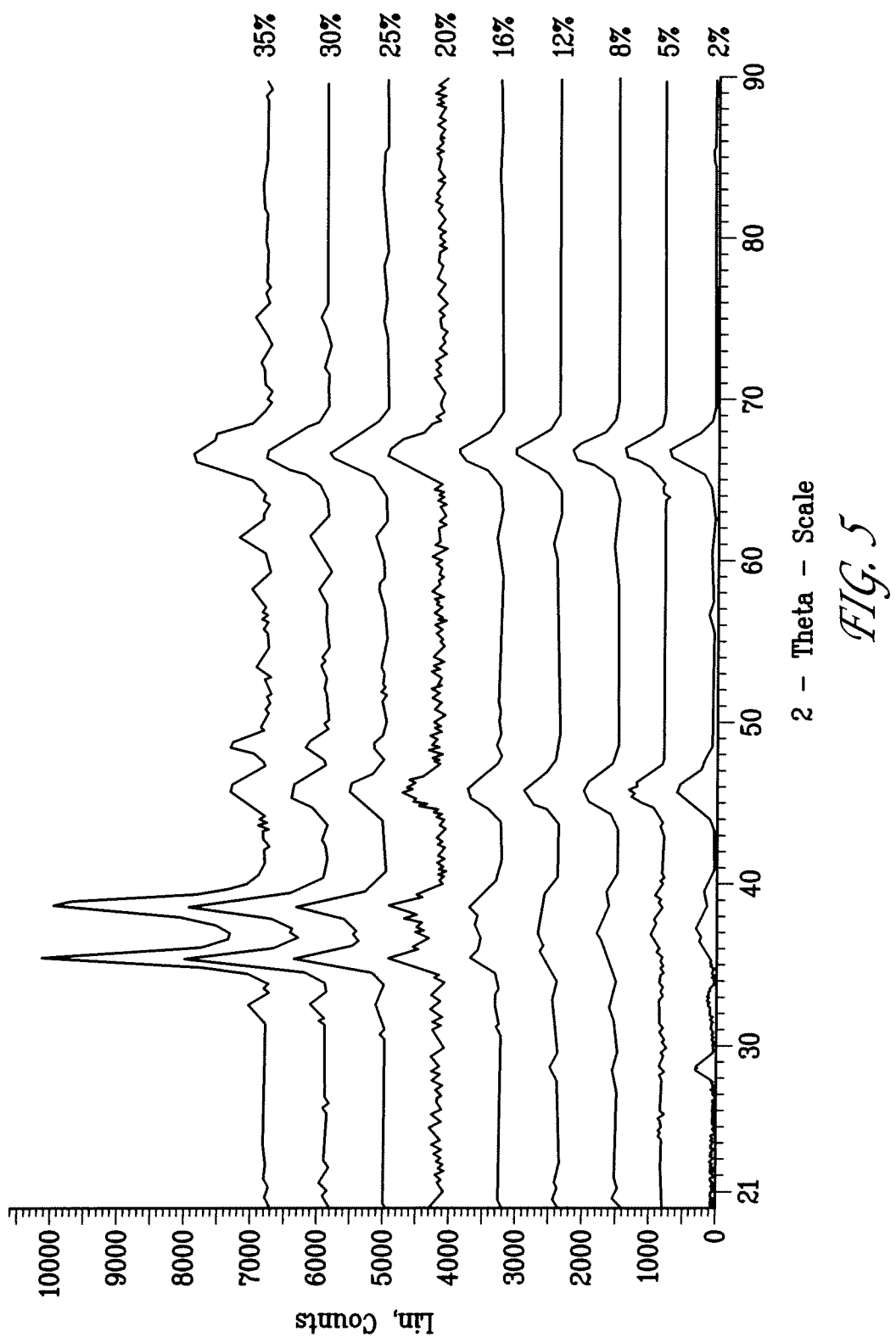

FIG. 5 shows XRD patterns obtained for catalysts with 2-35 wt % of Cu dispersed on La—$Al_2O_3$ support. The XRD patterns for Cu loadings between 2 and 16 wt % showed only lines characteristic of the La—$Al_2O_3$ carrier. For catalysts powder with 20 wt % of Cu, very broad peaks characteristic of CuO became distinguishable. The intensity of CuO peaks increased with higher loading and the CuO crystal size for 25 wt % catalyst was estimated at 7.1 nm based on Scherrer equation. The catalyst surface area decreased with increased loading of active phase from 180 m2/g (for pure $Al_2O_3$ powder) to 140 m2/g for 25 wt % loading.

Example 3

This Example is similar to Example 1 in employing a solution of catalyst precursor in which are dispersed particles of an oxygen storage material and a refractory material. However, in Example 3 the particles of oxygen storage material are produced by flame conversion of a solution of precursor compounds to the mixed oxide employed as the oxygen storage material.

2.280 kg of a solution of cerium 2-ethylhexanoate in ethylhexanoic acid/mineral spirit, 0.68 kg of a solution of zirconium 2-ethylhexanoate in ethylhexanoic acid/mineral spirit, and 0.64 kg of a solution of lanthanum 2-ethylhexanoic in ethylhexanoic acid/mineral spirit are mixed with 1.2 kg of toluene to provide a precursor solution. The solution is dispersed and introduced into a flame at a precursor flow rate of 20 mL/min. Oxygen is used as a dispersion gas at 45 standard liter per minute.

The collected cerium zirconium lanthanum oxide (CZL) powder has a surface area as measured by BET of between 69 and 76 $m^2$/g and has a residual carbon content of 0.53 wt. %. He-Pycnometry shows an average particle density of between 6.5 and 7.5 g/$cm^3$.

503 g of the resultant CZL powder is formed into a slurry with 754 g of lanthanum stabilized alumina and 34.78 kg water and then 573 g of $Cu(NO_3)_2 \cdot xH_2O$ (x=2.5-3) is dissolved in the slurry. The combined mixture is sheared for about 1-2 hours until the components are intimately mixed. The slurry is then introduced into a spray nozzle to generate an aerosol that is heated in a spray conversion reactor using air as the carrier gas. The spray conversion reactor is operated with an inlet temperature of 575° C. and an outlet temperature of 340° C. to produce a powder batch.

The X-ray diffraction (XRD) pattern of the as-synthesized powder product does not show any peaks that can be assigned to any Cu species indicating that the crystallites of the Cu species are in the sub 10 nm size range and uniformly distributed over the solid materials. The crystallite size of CZL calculated from Scherrer equation is about 14 nm.

The surface area of the powder as measured by BET is 131 $m^2$/g. Particle size distribution appears to be bimodal with d10 of 1.8 micron, d50 of 5.9 micron, and d95 of 15.8 micron. He-pycnometry shows an average particle density of 4.134 g/$cm^3$.

The catalyst powder is formed into a slurry and coated onto a monolith to produce a catalyst. Catalytic testing is performed at 450° C. at varying air-fuel ratios. Using a feed stream composed of 250 ppm NO, 2000 ppm CO, 30 ppm $C_3H_8$, 20% $CO_2$, 10% $H_2O$, air for adjusting the air to fuel ratio to 1.0, and nitrogen as the balance, the catalyst in a fresh state is found to convert 95.4% $NO_x$ and 98.5% CO. After high temperature fuel cut aging at 800° C. for 16 hours, the catalyst is found to convert 64.6% $NO_x$ and 95.2% CO.

Example 4

This Example is similar to Example 3 in employing particles of oxygen storage material produced by flame conversion of a solution of precursor compounds. However, in Example 4 the OSM particles are dispersed in an aqueous solution of precursors to a catalytically active material and stabilizer for a refractory support, which solution is subjected to spray conversion to produce the desired powder batch.

25.6 g of $La(NO_3) \cdot 6H_2O$ are dissolved in a slurry comprising 242.9 g of cerium zirconium lanthanum oxide (CZL) and 12.39 kg water. After shear mixing for about 10 minutes 162.9 g of $Cu(NO_3)_2 \cdot xH_2O$ (x=2.5-3) are added followed by 409.3 g of alumina. The resulting slurry is acidified by adding 18.6 g of a 50 wt. % nitric acid solution. All reagents except CZL are used as directly supplied from vendors. The CZL used is made according to Example 4. The combined mixture is sheared for about 1-2 hours until the components are intimately mixed. The slurry is then introduced into a spray nozzle to generate an aerosol that is heated in a spray conversion reactor using air as the carrier gas. The spray conversion reactor is operated with an inlet temperature of 575° C. and an outlet temperature of 340° C.

The X-ray diffraction (XRD) pattern of the resultant powder product does not show any peaks that can be assigned to any Cu species indicating that the crystallites of the Cu species are in the sub 10 nm size range and uniformly distributed over the solid materials. The crystallite size of CZL calculated from Scherrer equation is about 15 nm.

The surface area of the powder as measured by BET is 73 $m^2$/g. The particle size distribution appears to be bimodal with d10 of 2.1 micron, d50 of 4.4 micron, and d95 of 18.8 micron. He-pycnometry shows an average particle density of 4.186 g/$cm^3$.

Example 5

This Example is similar to Example 1 in employing a solution of catalyst precursor and particles of an oxygen storage material and a refractory material. However, in this example the oxygen storage material is first deposited on La—Al$_2$O$_3$ carrier using a spray conversion of a solution of precursor compounds to the mixed oxide employed as the oxygen storage material.

1614 g of Ce nitrate, 398 g of La nitrate, and 578 g of zirconyl nitrate is dissolved in a slurry comprising 1500 g of lanthanum stabilized alumina and 34.82 kg of water. All reagents are used as directly supplied from vendors. The combined mixture is sheared for about 1-2 hours until the components are intimately mixed. The slurry is then introduced into a spray nozzle to generate an aerosol that is heated in a spray conversion reactor using air as the carrier gas. The spray conversion reactor is operated with an inlet temperature of 575° C. and an outlet temperature of 340° C. to produce a powder batch.

Figure 6:
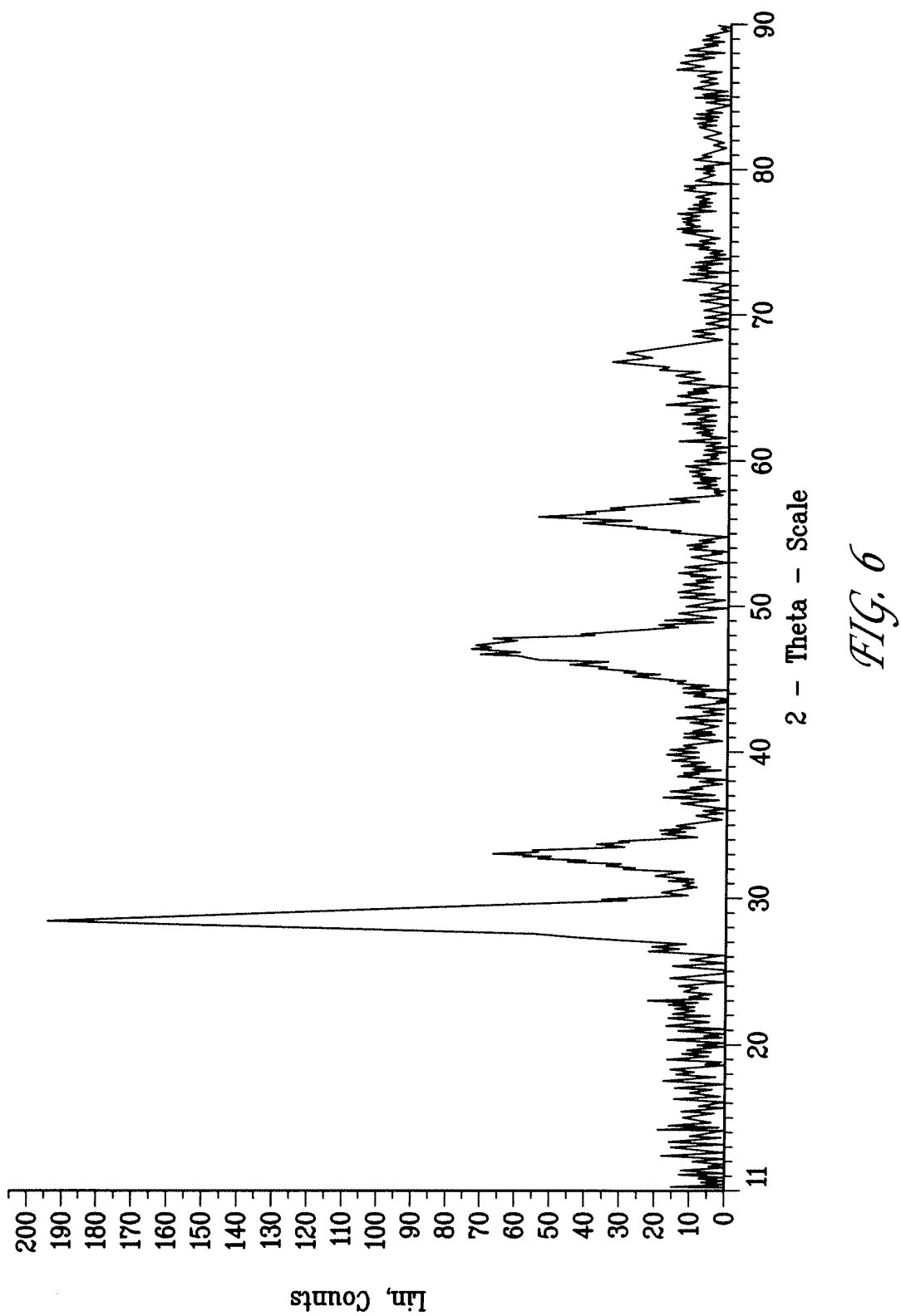
FIG. 6 shows X-ray diffraction patterns of the powder products of Example 5.

The collected cerium zirconium lanthanum oxide/La—Al$_2$O$_3$ (CZL/La—Al$_2$O$_3$) powder has a surface area as measured by BET of over 100 m$^2$/g and XRD pattern as shown in FIG. 6. The crystallite size of Ce-based component calculated from Scherrer equation is about 6.5 nm.

1460 g of the resultant CZL/La—Al$_2$O$_3$ powder is formed into a slurry with 623 g of Cu(NO$_3$)$_2$ xH$_2$O (x=2.5-3) and 18.78 kg of water. The combined mixture is sheared for about 1-2 hours until the components are intimately mixed. The slurry is then introduced into a spray nozzle to generate an aerosol that is heated in a spray conversion reactor using air as the carrier gas. The spray conversion reactor is operated with an inlet temperature of 575° C. and an outlet temperature of 340° C. to produce a powder batch.

The X-ray diffraction (XRD) pattern of the as-synthesized powder product does not show any peaks that can be assigned to any Cu species indicating that the crystallites of the Cu species are in the sub 10 nm size range and uniformly distributed over the solid materials. The surface area of the powder as measured by BET is 90 m$^2$/g.

The catalyst powder is formed into a slurry and coated onto a monolith produce a catalyst. Catalytic testing to determine light-off temperature is performed for 100-650° C. and fixed air-fuel ratio. The catalyst that was fuel cut aged at 800° C. for 16 hr to is found to have light-off temperature for 50% conversion of 400° C. for NOx, 338° C. for CO, and 494° C. for HC.

Example 6

In this Example, a flame spray process is used to produce a powder batch from a solution containing precursors to a catalytically active material and an oxygen storage material dissolved in ethylhexanoic acid/mineral spirit as a solvent and fuel for the flame spray process.

587 g of a solution of cerium 2-ethylhexanoate in ethylhexanoic acid/mineral spirit, 171.1 g of a solution of zirconium 2-ethylhexanoate in ethylhexanoic acid/mineral spirit, 164.7 g of a solution of lanthanum 2-ethylhexanoate in ethylhexanoic acid/mineral spirit and 169 g of a solution of copper 2-ethylhexanoate in ethylhexanoic acid/mineral spirit are mixed with 2.302 kg toluene to provide a precursor solution. The solution is dispersed and introduced into a flame at a precursor flow rate of 10 mL/min. Oxygen is used as a dispersion gas at 45 standard liter per minute.

Figure 7:
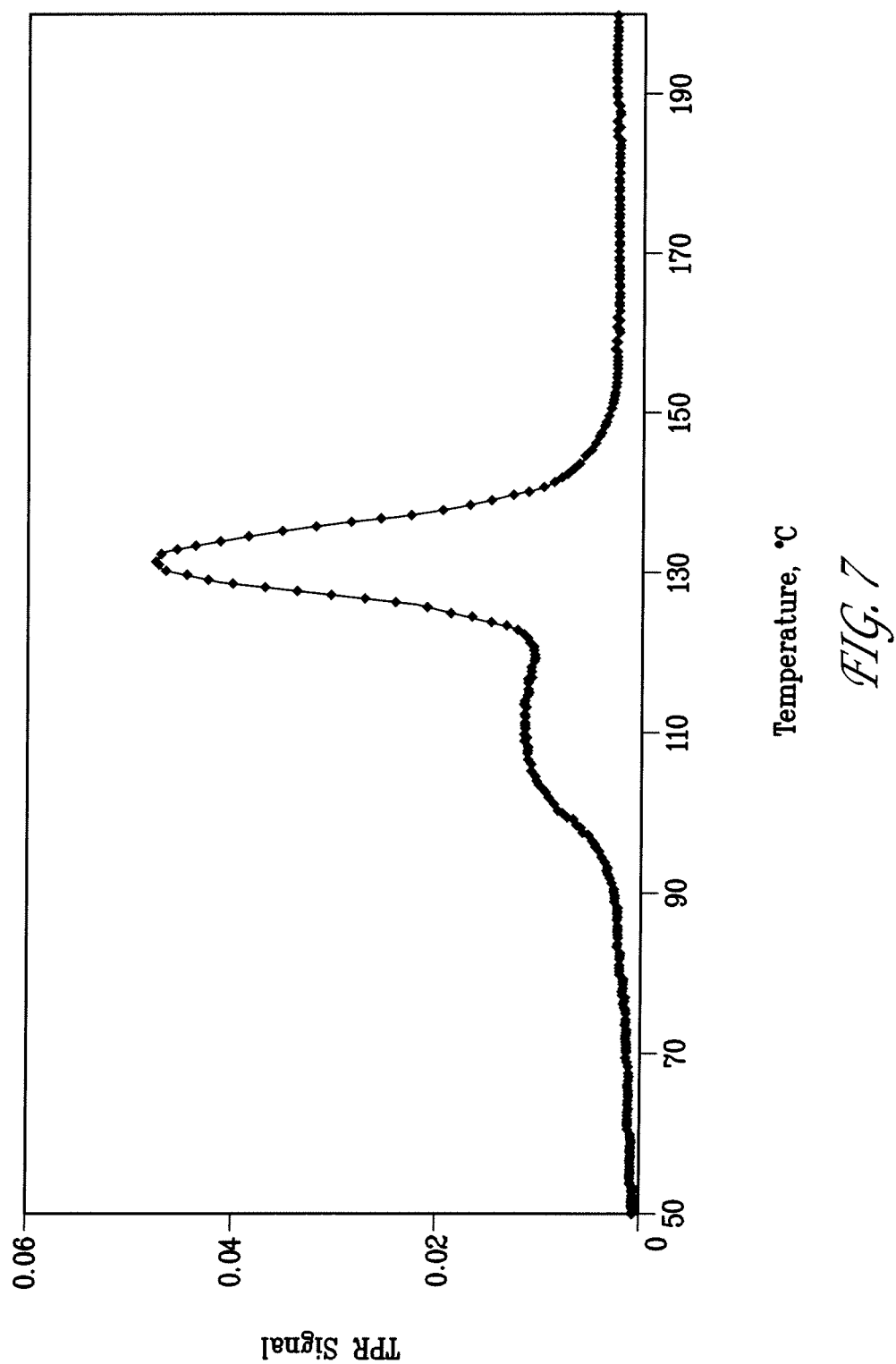
FIG. 7 is a hydrogen temperature program reduction ($H_2$-TPR) spectrum of the as-synthesized powder product of Example 6.

The surface area of the collected powder as measured by BET is 84 m$^2$/g. Residual carbon content is determined to 0.72 wt. %. Hydrogen TPR experiments on the as-synthesized sample show a strong reduction peak attributed to copper oxide with maximum H$_2$ uptake at 130° C. [FIG. 7].

The catalyst powder is pelletized and catalytic testing is performed at 450° C. at varying air-fuel ratios. Using a feed stream composed of 250 ppm NO, 2000 ppm CO, 30 ppm C$_3$H$_8$, 20% CO$_2$, 10% H$_2$O, air for adjusting the air to fuel ratio to 1.0, and nitrogen as the balance, the catalyst in a fresh state is found to convert 96% NO$_x$ and 95% CO.

Example 7

In this Example, a spray conversion process is used to produce a powder batch from a solution of a precursor to a catalytically active material, with as-made particles of an oxygen storage material being dispersed in the solution.

253.4 g of Cu(NO$_3$)$_2$ xH$_2$O (x=2.5-3) is dissolved in a slurry comprising 767.0 g cerium zirconium aluminum oxide (CZA) and 14.57 kg water. All reagents are used as directly supplied from vendors. The combined mixture is sheared for about 1-2 hours until the components are intimately mixed. The slurry is then introduced into a spray nozzle to generate an aerosol that is heated in a spray conversion reactor using air as the carrier gas. The spray conversion reactor is operated with an inlet temperature of 575° C. and an outlet temperature of 340° C. to produce a first powder batch (Catalyst A).

As a compositional variation, in a separate experiment 475.1 g of Cu(NO$_3$)$_2$ xH$_2$O (x=2.5-3) is dissolved in a slurry comprising 708.0 g cerium zirconium aluminum oxide (CZA) and 13.45 kg water. The combined mixture is then treated as described in the previous paragraph to produce a second powder batch (Catalyst B).

The X-ray diffraction (XRD) pattern of Catalyst A does not show any peaks that could be assigned to any Cu species indicating that the crystallites of the Cu species are in the sub 10 nm size range and uniformly distributed over the solid materials. Inspection of the XRD pattern of Catalyst B reveals broad peaks indicating the presence of small sized CuO phase crystallites.

The surface area of the powders as measured by BET is 148 m$^2$/g for Catalyst A, and 135 m$^2$/g for Catalyst B. Particle size distribution for Catalyst B appears to be mono-modal with d10 of 1.7 micron, d50 of 3.8 micron, and d95 of 11.0 micron. He-pycnometry shows an average particle density of 3.858 g/cm$^3$ and 3.974 g/cm$^3$ for Catalysts A and B, respectively.

The catalyst powder is formed into a slurry and coated onto a monolith to produce a catalyst. Catalytic testing is performed at 450° C. at varying air-fuel ratios. Using a feed stream composed of 250 ppm NO, 2000 ppm CO, 30 ppm C$_3$H$_8$, 20% CO$_2$, 10% H$_2$O, air for adjusting the air to fuel ratio to 1.0, and nitrogen as the balance, the Catalyst A in a fresh state is found to convert 99.1% NO$_x$ and 99.5% CO. The Catalyst B in a fresh state is found to convert 99.8% NO$_x$ and 99.6% CO.

Example 8

503 g of CuO-containing cerium zirconium lanthanum oxide (CZL) from Example 6 and 656 g lanthanum stabilized alumina (4.5% La) are suspended in 14.57 kg water. Lanthanum stabilized alumina is used as directly supplied from vendors. The combined mixture is sheared for about 1-2 hours until the components are intimately mixed. The slurry is then introduced into a spray nozzle to generate an aerosol that is heated in a spray conversion reactor using air as the carrier gas. The spray conversion reactor is operated with an inlet temperature of 575° C. and an outlet temperature of 340° C.

The X-ray diffraction (XRD) pattern of the resultant powder batch reveals broad peaks indicating the presence of small sized CuO phase crystallites that are uniformly distributed over the solid materials. The crystallite size of Cu/CZL calculated from Scherrer equation is about 19 nm.

The surface area of the powder as measured by BET is 140 m²/g. Particle size distribution appears to be bi-modal with d10 of 1.7 micron, d50 of 4.6 micron, and d95 of 15.3 micron. He-pycnometry shows an average particle density of 4 g/cm³.

The catalyst powder is formed into a slurry and coated onto a monolith to produce a catalyst. Catalytic testing is performed at 450° C. at varying air-fuel ratios. Using a feed stream composed of 250 ppm NO, 2000 ppm CO, 30 ppm $C_3H_8$, 20% $CO_2$, 10% $H_2O$, air for adjusting the air to fuel ratio to 1.0, and nitrogen as the balance, the catalyst in a fresh state is found to convert 84% $NO_x$ and 97% CO. After high temperature fuel cut aging at 800° C. for 16 hours, the catalyst is found to convert between 51% $NO_x$ and 93.7% CO.

Example 9

This Example is similar to Example 6 but employs palladium as the catalytically active material.

228.3 g of palladium nitrate solution (15.23 wt. % metal basis) is dissolved in a slurry comprising 1.628 kg cerium zirconium neodymium praseodymium oxide (CZNP) and 37.13 kg water. All reagents are used as directly supplied from vendors. The combined mixture is sheared for about 1-2 hours until the components are intimately mixed. The slurry is then introduced into a spray nozzle to generate an aerosol that is heated in a spray conversion reactor using air as the carrier gas. The spray conversion reactor is operated with an inlet temperature of 575° C. and an outlet temperature of 340° C.

The X-ray diffraction (XRD) pattern of the resultant powder batch shows peaks that can be attributed to the fluorite phase of cerium zirconium neodymium praseodymium oxide. No other peaks are detected indicating that the crystallites of the Pd species are in the sub 10 nm size range and uniformly distributed over the solid materials. The crystallite size of CZNP calculated from Scherrer equation is about 16 nm. High resolution Transmission Electron Microscopy (HR-TEM) coupled with Energy dispersive X-ray (EDS) of the powder after collection shows that Pd species are fully dispersed on the oxygen storage material. No small Pd or PdO particles are detected on the surface of CZNP crystals.

Elemental analysis of the resulting powder as measured by inductively coupled plasma (ICP) spectrometry shows that the powder contains about 2.0 wt. % Pd. The surface area of the powder as measured by BET is between 64 and 69 m²/g. The total pore volume of pores by single point adsorption is 0.31 g/cm³. The adsorption average pore width as measured by BET is 19.5 nm. Spread of the particle size distribution shows d10 of 0.3 micron, d50 of 1.6 micron, and d90 of 5.4 micron.

After fuel cut aging the XRD pattern of the powder batch shows small peaks that can be attributed to Pd metal phase in addition to the fluorite phase of CZNP. The crystallite size of CZNP calculated from Scherrer equation increased to 100 nm. The surface area and pore volume dropped to 25 m²/g and 0.15 cm³/g, respectively.

High Resolution Transmission Electron Microscopy (HR-TEM) of the powder after aging shows crystals of fluorite phase with no distinct Pd or PdO. Energy dispersive X-ray (EDS) indicates the presence of Pd that is uniformly dispersed throughout the sample. Only very few examples of discrete Pd particles with sizes around 10 nm are detected with HRTEM.

The catalyst powder is palletized and catalytic testing is performed at 375° C. at varying air-fuel ratios. After aging at 1000 C. for 20 hours and adjusting the air to fuel ratio to 1.0, the catalyst is found to convert 99% of $NO_x$, 85% CO and 81% of HC.

Example 10

This Example is similar to Example 1 but employs a solution of precursors to a catalytically active material and a refractory support in an aqueous slurry of as-made OSM particles.

212.7 g of $Cu(NO_3)_2$ $xH_2O$ (x=2.5-3), 355.3 g of manganese nitrate pentahydrate, 186.3 g of strontium nitrate and 571.9 g of lanthanum nitrate hexahydrate are dissolved in a slurry comprising 3505.2 g cerium zirconium neodymium praseodymium oxide (CZNP) and 43.48 kg water. All reagents are used as directly supplied from vendors. The combined mixture is sheared for about 1-2 hours until the components are intimately mixed. The slurry is then introduced into a spray nozzle to generate an aerosol that is heated in a spray conversion reactor using air as the carrier gas. The spray conversion reactor is operated with an inlet temperature of 575° C. and an outlet temperature of 340° C.

The X-ray diffraction (XRD) pattern of the resultant powder batch shows peaks that can be attributed to the cerium zirconium neodymium praseodymium oxide phase. No other peaks are detected indicating that the crystallites of the Cu, Mn, Sr and/or La species (believed to be present as a perovskite structure) are in the sub 10 nm size range and uniformly distributed over the solid materials.

The surface area of the powder as measured by BET is 51 m²/g. The total pore volume of pores by single point adsorption is 0.225 cm³/g and the adsorption average pore width as measured by BET is 17.9 nm.

Example 11

This Example is similar to Example 1 but employs a solution of precursors to copper and iron oxides as the catalytically active material.

405.0 g of $Cu(NO_3)_2$ $xH_2O$ (x=2.5-3) and 343.8 g of iron nitrate nona hydrate are dissolved in a slurry comprising 573.2 g of cerium zirconium neodymium praseodymium oxide (CZNP), 859.9 g lanthanum stabilized alumina (4.5% La) and 41.45 kg water. All reagents are used as directly supplied from vendors. The combined mixture is sheared for about 1-2 hours until the components are intimately mixed. The slurry is then introduced into a spray nozzle to generate an aerosol that is heated in a spray conversion reactor using air as the carrier gas. The spray conversion reactor is operated with an inlet temperature of 575° C. and an outlet temperature of 340° C.

The X-ray diffraction (XRD) pattern of the resultant powder batch shows peaks that can be attributed to the cerium zirconium neodymium praseodymium oxide phase. No other peaks are detected indicating that the crystallites of the Cu and/or Fe species are in the sub 10 nm size range and uniformly distributed over the solid materials.

Elemental analysis of the resulting product as measured by inductively coupled plasma (ICP) spectrometry shows that the powder contains about 9.5 wt. % Cu. The surface area of the powder as measured by BET is 136 m²/g. The total pore volume of pores by single point adsorption is 0.473 cm³/g and the adsorption average pore width as measured by BET is 13.9 nm. Particle size distribution is mono-modal with d10 of 1.4 micron, d50 of 4.4 micron, and d90 of 12.1 micron.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A process for producing a powder batch comprising a plurality of particles, comprising:
   (i) providing a precursor medium comprising a liquid medium and (a) a first catalytically active component comprising at least one transition metal or a compound thereof; (b) a second component different from said first component, and capable of removing oxygen from, or releasing oxygen to, an exhaust gas stream; and (c) a third component different from said first and second components and comprising a refractory support, wherein at least one of said components (a) to (c) is provided in the form of a precursor to said component dissolved or suspended in said liquid medium; and
   (ii) heating droplets of said precursor medium carried in a gas stream to remove at least part of the liquid medium, chemically convert said precursor(s) to said at least one component, and form said plurality of particles containing all of components (a) to (c),
   wherein said plurality of particles when subjected to Temperature Programmed Reduction, exhibits at least one hydrogen absorption peak at a temperature of less than 160° C., and
   wherein the first catalytically active component comprises copper, and said plurality of particles, when subjected to X-ray analysis, exhibits no peaks characteristic of CuO for copper loading up to 8 wt % Cu per 100 m$^2$ of the surface of said particles.

2. The process of claim 1 wherein said precursor medium comprises a precursor to at least two of said components (a) to (c) dissolved or suspended in said liquid medium.

3. The process of claim 1 wherein said precursor medium comprises precursors to all of said components dissolved or suspended in said liquid medium.

4. The process of claim 1 wherein said precursor medium comprises suspended particles comprising at least one of said components (a) to (c).

5. The process of claim 1 wherein said heating is conducted at a temperature between about 200° C. and about 600° C.

6. The process of claim 5 wherein said heating is conducted at a temperature of at least 500° C.

7. The process of claim 1 wherein said heating is conducted by spray drying.

8. The process of claim 1 wherein said at least one transition metal comprises an element selected from the fourth Period of Groups 3 to 12 of the Periodic Table of Elements.

9. The process of claim 1 wherein said at least one transition metal comprises an element selected from the fifth and sixth Periods of Groups 8 to 11 of the Periodic Table of Elements.

10. The process of claim 1 wherein said first catalytically active component comprises an alloy of at least one transition metal selected from the fifth and sixth Periods of Groups 8 to 11 of the Periodic Table of Elements and at least one further metal selected from the Fourth period of Groups 3 to 12 of the Periodic Table and/or a further element from the fifth and sixth Periods of Groups 8 to 11 of the Periodic Table.

11. The process of claim 1 wherein said third component comprises an oxygen-containing compound of aluminum.

12. The process of claim 1 wherein said third component comprises an oxygen-containing compound of aluminum and one or more additional elements selected from lanthanum, magnesium, copper, iron, calcium, strontium, barium, phosphorus, silicon and mixtures thereof.

13. The process of claim 1 wherein said third component comprises a compound having the crystal structure of gamma alumina, transition phase alumina, a spinel, a perovskite, an ilmenite, a delafosite, a zeolite and/or an aluminophosphate.

14. The process of claim 1, wherein said second component comprises a cerium-containing oxide species.

15. The process of claim 14, wherein said cerium-containing oxide species contains one or more additional elements selected from the group consisting of zirconium, lanthanum, praseodymium, neodymium, yttrium, gadolinium and mixtures thereof.

16. The process of claim 1, wherein said heating results in condensation of composite particles containing all of components (a) to (c), such that component (a) is dispersed on component (b) and/or component (c).

17. The process of claim 1, wherein the first catalytically active component (a) is dispersed on the refractory support of component (c).

18. A process for producing a powder batch, the process comprising:
   (a) providing a precursor medium comprising a liquid medium and (a) a first catalytically active component comprising copper or a compound thereof; (b) a second component different from said first component and capable of removing oxygen from, or releasing oxygen to, an exhaust gas stream; and (c) a third component different from said first and second components and comprising a refractory support, wherein at least one of said components (a) to (c) is provided in the form of a precursor to said component dissolved or suspended in said liquid medium; and
   (b) heating droplets of said precursor medium carried in a gas stream to remove at least part of the liquid medium and chemically convert said precursor(s) to said at least one component, and form a plurality of particles containing all of components (a) to (c),
   wherein said plurality of particles, when subjected to X-ray analysis, exhibits no peaks characteristic of CuO for copper loading up to 8 wt % Cu per 100 m$^2$ of the surface of said particles.

19. The process of claim 18 wherein said second component is a mixed oxide of cerium, and at least one of lanthanum, aluminum, neodymium, yttrium, praseodymium and zirconium.

20. The process of claim 18, wherein said precursor medium comprises a precursor to at least one of said components (a) to (c) dissolved or suspended in said liquid medium.

21. The process of claim 18, wherein said precursor medium comprises a precursor to the second component dissolved or suspended in said liquid medium.

22. The process of claim 18, wherein said precursor medium comprises suspended particles comprising at least one of said components (a) to (c).

23. The process of claim 18, wherein said heating is conducted at a temperature between about 200° C. and about 600° C.

24. The process of claim 23, wherein said heating is conducted at a temperature of at least 500° C.

25. The process of claim 18, wherein heating is conducted by spray drying.

26. The process of claim 18, wherein said second component comprises a cerium-containing oxide species.

27. The process of claim 26, wherein said cerium-containing oxide species contains one or more additional elements selected from the group consisting of zirconium, lanthanum, praseodymium, neodymium, yttrium, gadolinium and mixtures thereof.

28. The process of claim 18, wherein said third component comprises an oxygen-containing compound of aluminum.

29. The process of claim 18, wherein said third component comprises an oxygen-containing compound of aluminum and one or more additional elements selected from the group consisting of lanthanum, magnesium, copper, iron, calcium, strontium, barium, phosphorus, silicon and mixtures thereof.

30. The process of claim 18, wherein said third component comprises a compound having the crystal structure of gamma alumina, transition phase alumina, a spinel, a perovskite, an ilmenite, a delafosite, a zeolite and/or an aluminophosphate.

31. The process of claim 18, wherein said heating results in condensation of composite particles containing all of components (a) to (c), such that component (a) is dispersed on component (b) and/or component (c).

32. The process of claim 18, wherein the first catalytically active component (a) is dispersed in the refractory support of component (c).

* * * * *